United States Patent
Berionne et al.

(10) Patent No.: US 8,862,113 B2
(45) Date of Patent: Oct. 14, 2014

(54) SUBSCRIBER IDENTITY MODULE ACTIVATION DURING ACTIVE DATA CALL

(71) Applicant: QUALCOMM Incorporated, San Diego, CA (US)

(72) Inventors: Michele Berionne, San Diego, CA (US); Yashodhan Tarte, San Diego, CA (US); Jose Alfredo Ruvalcaba, San Diego, CA (US); Shriram Ganesh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 56 days.

(21) Appl. No.: 13/671,463

(22) Filed: Nov. 7, 2012

(65) Prior Publication Data
US 2013/0344857 A1 Dec. 26, 2013

Related U.S. Application Data

(60) Provisional application No. 61/662,312, filed on Jun. 20, 2012.

(51) Int. Cl.
  *H04W 88/02* (2009.01)
  *H04W 8/26* (2009.01)
  *H04W 4/00* (2009.01)
  *H04W 8/20* (2009.01)

(52) U.S. Cl.
  CPC .............. *H04W 88/02* (2013.01); *H04W 8/265* (2013.01); *H04W 4/00* (2013.01); *H04W 8/205* (2013.01)
  USPC ........................................................ 455/418

(58) Field of Classification Search
  USPC ................................................. 455/418, 558
  See application file for complete search history.

(56) References Cited

U.S. PATENT DOCUMENTS

| | | | |
|---|---|---|---|
| 6,366,777 B1 | 4/2002 | Uusitalo | |
| 7,127,245 B2 | 10/2006 | Almgren | |
| 2005/0235149 A1 | 10/2005 | Beckmann et al. | |
| 2008/0020755 A1 | 1/2008 | Liu et al. | |
| 2010/0035577 A1 | 2/2010 | Rager et al. | |
| 2011/0092253 A1 | 4/2011 | Amiel et al. | |
| 2011/0294472 A1* | 12/2011 | Bramwell et al. | 455/413 |
| 2012/0106533 A1 | 5/2012 | Chen et al. | |
| 2013/0344857 A1* | 12/2013 | Berionne et al. | 455/418 |

OTHER PUBLICATIONS

3GPP TS 11.14 V8.18.0 (Jun. 2007), 3rd Generation Partnership Project; Specification of the SIM Application Toolkit for the Subscriber Identity Module—Mobile Equipment, (SIM-ME) interface, (Release 1999), pp. 1-157. (See 6.4.6 on p. 35, 6.4.7 on pp. 35-37 and 6.6.13 on p. 67).

(Continued)

*Primary Examiner* — Diane Mizrahi
(74) *Attorney, Agent, or Firm* — Howard Seo

(57) ABSTRACT

Methods and systems are disclosed that provide refresh procedure to ensure successful subscriber identity module activation during active data and voice calls. A request to update a subscription data on a network application housed on a Universal Integrated Circuit Card (UICC) is processed by a mobile equipment (ME) and is forwarded to the UICC smart card. The UICC smart card updates the requested parameters on the network application and probes the ME to read the updated parameters. The ME polls its services to check if the network application can be refreshed. If the network application was not previously activated, the voting mechanism on refresh procedure is skipped and the ME proceeds with refreshing the network application for updating its copy of the subscription information.

31 Claims, 5 Drawing Sheets

(56) References Cited

OTHER PUBLICATIONS

ETSI TS 102 223, V8.0.0, (Jul. 2008), "Smart Cards; Card Application Toolkit (CAT) (Release 8)", ETSI Standard, European Telecommunications Standards Institute (ETSI), Sophia Antipolis Cedex, France, vol. SCP-WG3, No. V8.0.0, Jul. 1, 2008, XP014041999.
International Search Report and Written Opinion—PCT/US2013/046663—ISA/EPO—Jan. 24, 2014.

* cited by examiner

SUBSCRIBER IDENTITY MODULE ACTIVATION DURING ACTIVE DATA CALL

CLAIM OF PRIORITY UNDER 35 U.S.C. §119

The present Application for Patent claims priority to Provisional Application No. 61/662,312, entitled "METHOD TO ENSURE SUCCESSFUL CSIM ACTIVATION DURING ACTIVE DATA CALL" filed Jun. 20, 2012, and assigned to the assignee hereof and hereby expressly incorporated by reference in its entirety herein.

FIELD OF DISCLOSURE

The present Application for Patent relates to a method and system for refreshing a network application on a Universal Integrated Circuit Card (UICC), even if a data call is currently active on a mobile equipment.

BACKGROUND

Many types of communication techniques and protocols have been developed over the years. One example is the wireless cellular telephone network. The cellular network relies upon digital or analog telecommunication signals in which a subscriber is wirelessly connected from a mobile telephone to a nearby transmitter. The transmitter's span of intended coverage is called a cell. Cellular telephone service is available in many diverse geographic areas, such as urban areas and along major highways. As the cellular telephone user moves from one cell or area of coverage to another, the telephone is effectively passed on to the local cell transmitter. Certain types of telephone services, such as Code Division Multiple Access (CDMA), may require the use of personalized plug-ins, called CDMA Subscriber Identity Module cards (CSIM cards). These CSIM cards are inserted into cellular telephone handsets that contain security codes and personal information specific to the service level, and individual preferences and data stored by the individual. A user can swap a CSIM card, so a new device need not be registered on the cellular network when a handset is replaced. For purposes of brevity, the term CSIM can refer to a CSIM card and any other memory device or module that stores information.

A CSIM stores an identification number of a home network and a subscriber within the home network which collectively can be called an international mobile subscriber identity (IMSI). The CSIM may optionally store other information about a user such as the user's name, telephone number, address book, and other identifying features. The CSIM may be an electronic memory device or other means for storing information. It may be mounted in a communication device or coupled to the communication device by a wired or wireless communication link. For example, a CSIM may be a thin card that is carried with a mobile telephone under a battery or behind a battery door.

The IMSI is a unique, non-dialable number allocated to each mobile subscriber that identifies the subscriber and his or her operator subscription. The IMSI is stored in the CSIM. The IMSI is made up of three parts: 1) the mobile country code (MCC) consisting of three digits, 2) the Mobile Network Code (MNC) consisting of two digits, and 3) the Mobile Subscriber Identity Number (MSIN) consisting of up to 10 digits.

A Home Location Register (HLR) is a database that contains mobile subscriber information for all subscribers. A Visitor Location Register (VLR) is a database owned and maintained by a mobile operator. It contains temporary information about mobile subscribers that are currently located in a geographic area serviced by that mobile operator, but whose Home Location Register (HLR) is elsewhere.

HLR subscriber information includes the IMSI, service subscription information, location information, service restrictions, and supplementary services information. The HLR also initiates transactions with the VLR to complete incoming calls and to update subscriber data.

A Universal Integrated Circuit Card (UICC) is a smart card used in mobile terminals in Global Systems for Mobile Communications (GSM) and Universal Mobile Telecommunications System (UMTS) networks. The UICC ensures the integrity and security of multiple kinds of personal data. In a GSM network the UICC contains a SIM network application. In a UMTS network, the UICC contains a USIM network application. A UICC may contain several network applications, making it possible for the same smart card to give access to both GSM and UMTS networks, and also provide storage for a phone book and other applications. It is also possible to access a GSM network using a USIM network application, and it is possible to access UMTS networks using a SIM network application with mobile terminals prepared for this type of communication.

In a CDMA network, the UICC contains a CSIM network application, in addition to 3GPP USIM and SIM applications. A card with all three features is called a removable user identity card (R-UIM). Thus the R-UIM card can be inserted into CDMA, GSM, or UMTS handsets and will work in all three cases.

The UICC smart card consists of a CPU, ROM, RAM, EEPROM and I/O circuits. Early versions consisted of the full-size (85×54 mm, ISO/IEC 7810 ID-1) smart card. The development of smaller and lighter telephones, with a smaller form factor and decreased internal real estate, called for a smaller version of the card. In some of the newer phones, the UICC card was cropped down to 25×15 mm (ISO/IEC 7810 ID-000). There may be further changes to smart card design, depending upon the design of the phone, or other mobile devices that these cards may support.

Since the card slot is standardized, a subscriber can easily move their wireless account and phone number from one handset to another. This will also transfer their phone book and text messages. Similarly, a subscriber can usually change carriers by inserting a new carrier's UICC card into their existing handset. However, it is not always possible because some carriers in certain countries (e.g., in U.S.) SIM-lock the phones that they sell, thereby preventing rival carriers' cards from being used in their phones.

The use and content of the card can be protected by use of PIN codes. One code, PIN1, can be defined to control normal use of the phone. Another code, PIN2, can be set, to allow the use of special functions (like limiting outbound telephone calls to a list of numbers). PUK1 and PUK2 are used to reset PIN1 and PIN2, respectively.

Other possible applications on a UICC smart card include Intelligent SIM (ISIM), to secure mobile access to IP multimedia services, and non-telecom applications such as payment. For example, many subscribers have a UICC with USIM and ISIM applications for phone service and multimedia respectively.

CSIM may also be an application on a universal integrated circuit card (UICC). After activation of a CSIM application on a UICC, the card triggers a refresh procedure asking the mobile equipment (ME) to read a set of files that may have changed during the activation process in order to update the ME's copy of those files. During normal operation, the refresh procedure triggered by the card should not cause a dropped voice or data call. The trigger for the refresh may also be carried out by the ME in order to update its activation and user files.

In order to implement this logic, when a proactive command with a refresh command/message is received from the UICC card, the ME polls its internal services via a voting mechanism to determine if a refresh can be carried out. In the case where one or more of internal service votes are received against the refresh, the request is rejected. After card activation, the ME may have an active data call, causing the refresh to be postponed. This might happen for several attempts that are initiated by the card. This may result in a long delay, before the actual refresh takes place.

As a result, the newly-programmed mobile identification number-based IMSI (IMSI_M) value is not available to the ME. The unavailability of the IMSI_M makes the ME unable to perform a voice call over a CDMA network and typically shows an "Emergency calls only" message on the screen to the user. This might be interpreted as a malfunctioning device, even if every module is working in accordance with the original design and expected operation. This and other features of the refresh procedure are described throughout the present specification and more particularly below. It is therefore desirable to have a solution that can overcome voting mechanism latency for faster, more accessible refresh options.

SUMMARY

Exemplary embodiments of the disclosure are directed to systems and methods for identifying mobile device motion events.

Further scope of the applicability of the described systems and methods will become apparent from the following detailed description, claims, and drawings. The detailed description and specific examples, while indicating specific examples of the disclosure and claims, are given by way of illustration only, since various changes and modifications within the spirit and scope of the description will become apparent to those skilled in the art.

In one embodiment, a method is disclosed to ensure a successful network application activation during an active call that includes activating a network application subscription on a Universal Integrated Circuit Card (UICC) in a mobile equipment (ME), performing a refresh procedure on the mobile equipment, if the network application subscription was not previously activated, and polling the ME to determine if the refresh procedure can proceed, if the network application subscription was previously activated.

In another embodiment, an apparatus for wireless communications is disclosed, the apparatus includes means for activating a network application subscription on a Universal Integrated Circuit Card (UICC) in a mobile equipment (ME), means for performing a refresh procedure on the mobile equipment, if the network application subscription was not previously activated, and means for polling the ME to determine if the refresh procedure can proceed, if the network application subscription was previously activated. The apparatus further includes wherein the means for polling the ME includes means for polling the active services of the ME. The apparatus further includes wherein the means for triggering a refresh are performed by a UICC processor, wherein the processor is configured to trigger a refresh procedure with the ME, skip polling of ME services and proceed with refresh procedure to update network application subscriptions.

In another embodiment, a computer program product for wireless communications in a wireless network is disclosed, the computer program product includes a non-transitory computer-readable medium having program code recorded thereon, the program code includes program code to activate a network application subscription on a Universal Integrated Circuit Card (UICC) in a mobile equipment (ME), program code to perform a refresh procedure on the mobile equipment, if the network application subscription was not previously activated; and program code to poll the ME to determine if the refresh procedure can proceed, if the network application subscription was previously activated.

Another exemplary embodiment includes an apparatus for wireless communication that comprises a memory, a Universal Integrated Circuit Card (UICC), at least one processor coupled to the memory and the UICC card, the at least one processor is configured to check if the network application subscription was previously activated and perform a refresh procedure if the network application subscription was not previously activated, wherein the refresh procedure is performed by skipping a polling mechanism. The UICC card also includes a central processing unit (CPU), a read only memory (ROM) and a communications interface, wherein the communications interface is configured to receive input and place output of refresh procedures and CSIM subscription and activation status to an external device. The various components of the UICC card are configured to communicate via a bus interface that allows for the processing network application activation commands, refresh procedure commands, polling commands and subscription update commands.

BRIEF DESCRIPTION OF THE DRAWINGS

The accompanying drawings are presented to aid in the description of embodiments of the disclosure and are provided solely for illustration of the embodiments and not limitation thereof.

DETAILED DESCRIPTION

Figure 1:
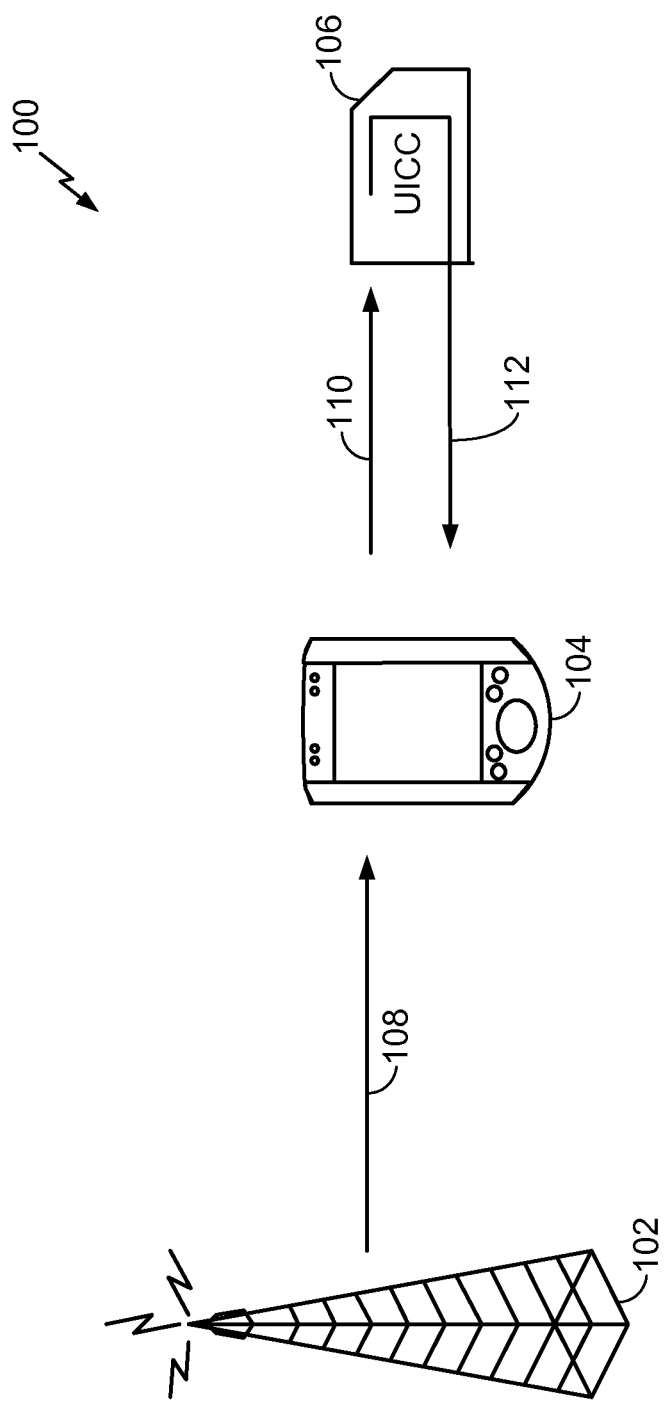
FIG. 1 illustrates an exemplary wireless network communication system demonstrating the interaction between cell tower, user equipment and a UICC card.

Aspects of the disclosure are disclosed in the following description and related drawings directed to specific embodiments of the disclosure. Alternate embodiments may be devised without departing from the scope of the disclosure. Additionally, well-known elements of the disclosure will not be described in detail, or will be omitted, so as not to obscure the relevant details of the disclosure.

The word "exemplary" is used herein to mean "serving as an example, instance, or illustration." Any embodiment described herein as "exemplary" is not necessarily to be construed as preferred or advantageous over other embodiments. Likewise, the term "embodiments of the disclosure" does not require that all embodiments of the disclosure include the discussed feature, advantage, or mode of operation.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described as, for example, "logic configured to" or "program code" configured to perform the described action.

Accordingly, systems and methods are provided herein for detecting whether a voice or data connection is active between a mobile equipment (ME) and a mobile network and determining a refresh that is least impactful on the system. The proposed solution aims to skip the voting mechanism altogether for the first refresh that happens after the network application activation, such as a CSIM activation, when the IMSI_M gets programmed.

FIG. 1 illustrates a wireless mobile network 100 for communication between a cell tower 102 and mobile equipment (ME) 104. Typically, the mobile equipment would be any type of mobile equipment that includes, but is not limited to cell phones, PDAs, and other wireless communication devices that are configured to receive and interface with a UICC smart card 106. Those skilled in the art will appreciate that the UICC smart card may be located internally or externally to the device.

A UICC smart card may contain several network applications for different network configurations such as SIM, USIM and/or CSIM. In one exemplary embodiment, UICC smart card 106 contains a CSIM network application (not shown) as an example for CDMA networks. Cell tower 102 would send an update request 108 to update subscription data from the CSIM network application on UICC smart card 106 positioned within ME 104. After receiving update request 108 from cell tower 102, ME 104 may forward an information update request 110 to UICC smart card 106. The CSIM network application on UICC smart card 106 contains network and user subscription data. Upon receiving information update request 110 from ME 104, UICC smart card 106 would retrieve requested update status 112 and send requested update status 112 back to ME 104 to read. Information update request 110 may also include different types of requests, including but not limited to network application activation status and update information to be installed on UICC smart card 106.

In one embodiment, when UICC smart card 106 is requested to update subscription information from ME 104, UICC smart card 106 would include a CSIM network application. The CSIM network application includes a subscription manager that would facilitate creation, storage, and tracking of the subscription or user account for the network, as well as verification of the user's existing account/subscription and selective setup of the billing for subscribed services. UICC smart card 106 can receive the request to update subscription, or refresh the subscription information. Upon receiving the request, UICC smart card 106 may include a central processing unit that would process the request and access the CSIM network application to retrieve the required information, such as network subscription status. UICC smart card 106 can also generate its own request to update the subscription by triggering the refresh procedure with ME 104, updating the CSIM network application and passing that information via a requested update status 112 back to ME 104.

Figure 2:
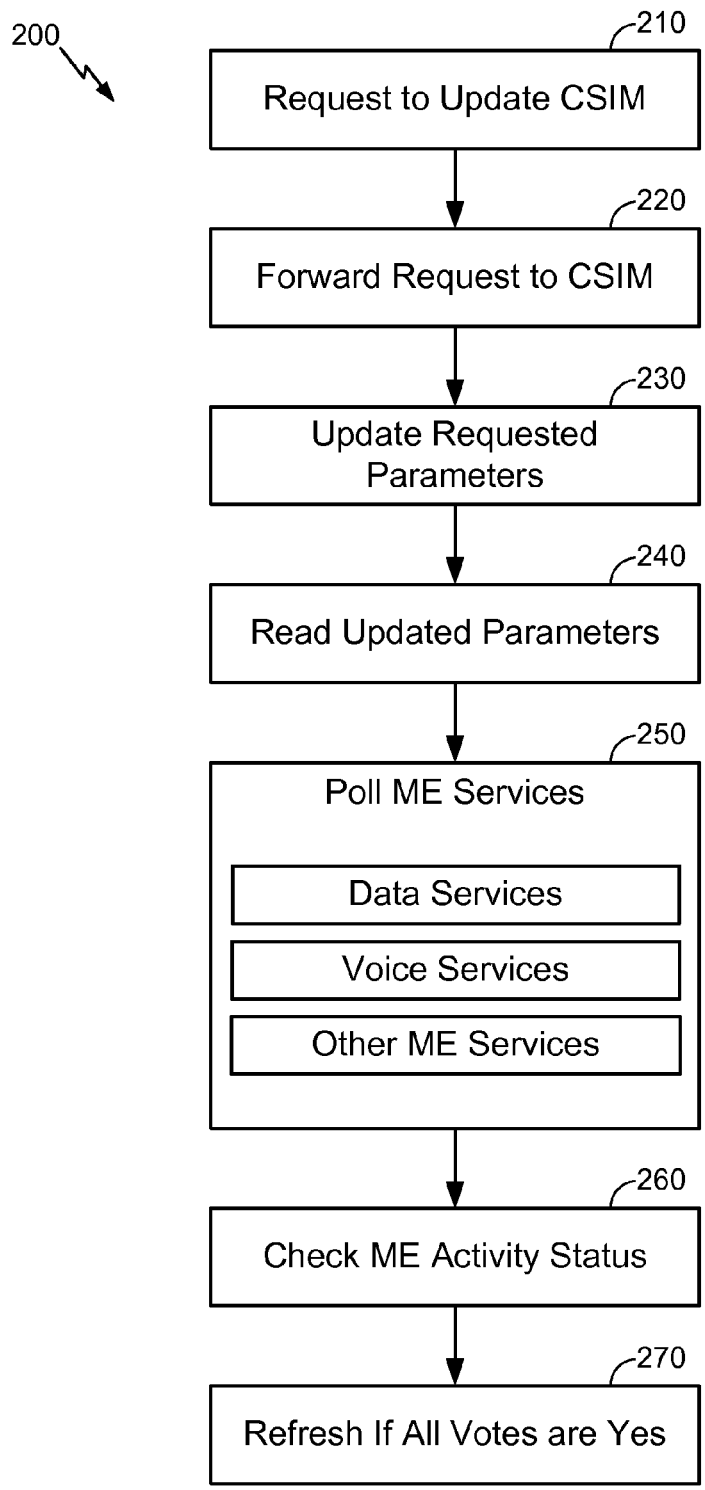
FIG. 2 illustrates an exemplary method for ensuring successful network application activation during an active data call.

FIG. 2 illustrates a method 200 to ensure successful UICC network application activation during active voice or data call according to an example embodiment. As shown, a network would successfully activate a UICC network application, in this case a CSIM network application, during active voice or data service by requesting to update CSIM network application (block 210). The request can have many sources. For example, the request to update the CSIM can be generated at the network level, the mobile equipment level, or the UICC level. As previously illustrated, UICC smart card 106 may come loaded with many different network applications such as CSIM, USIM, and ISIM among others. Out of these applications, the CSIM network application needs to be activated by the network when, for example, UICC smart card 106 is inserted in ME 104. The network updates subscription information on UICC smart card 106 via procedures like over-the-air service provisioning (OTASP) or bearer independent protocol (BIP). In one embodiment, a forwarding request to UICC smart card 106 is then obtained from ME 104 (block 220).

Network application information, such as subscription data, may then be updated by UICC smart card 106 by accessing the CSIM network application (block 230), and the subscription data is then sent to ME 104 to be read. After ME 104 reads (block 240) the updated parameters, in this example subscription data, active ME 104 services may then be polled to check if the CSIM network application can be refreshed on UICC smart card 106 (block 250). If the CSIM network application was not activated previously, blocking the refresh would keep ME 104 unaware of available CSIM subscriptions and unable to connect to a CDMA network. In one embodiment, polling (block 250) may allow ME 104 to drop the call in a specific situation so that the refresh can be executed. Polling (block 250) may be a mechanism by which ME 104 or UICC smart card 106 polls different services within ME 104 to decide whether to continue with refresh. These services may be data services, voice services, or other ME services that may be active at the time of polling.

Polling votes can be collected at ME 104 or UICC smart card 106. In one example, after UICC smart card 106 collects votes from different services in ME 104 on whether to continue with a proposed refresh, UICC smart card 106 may proceed with a proposed refresh only if all the polling votes are "YES" for a refresh. Polling is used because the refresh may require disrupting an existing connection between UICC smart card 106 and ME 104 and/or between ME 104 and the network and thus may disrupt an ongoing ME 104 service. The existing connection may rely on data from a network application on UICC smart card 106, such as CSIM network application, to maintain a connection.

ME 104 connection activity status (e.g., active or non active) may then be checked to determine if it can be interrupted for requesting a refresh to update the CSIM network application on UICC smart card 106 or not (block 260). If all polling votes are "YES" for a refresh, ME 104 may then proceed with reading the CSIM network application data on UICC smart card 106 and update its own copy of the data read from UICC smart card 106 (block 270). This polling may result in a dropped call only if all polling votes return a "YES" vote for a refresh.

In another embodiment, the polling device, such as ME 104 or UICC smart card 106 may be enabled to ignore the votes and continue with a proposed refresh if the CSIM network application has not been activated previously. In this case, a dropped call may result as a consequence of the refresh. Other results may include an interruption or drop in service. In one embodiment, after a call is dropped due to a refresh procedure, a special notification may be included to alert the user of the reason for the dropped call. The receipt of such notification may indicate a dropped call occurred due to an activation or a refresh procedure.

Figure 3:
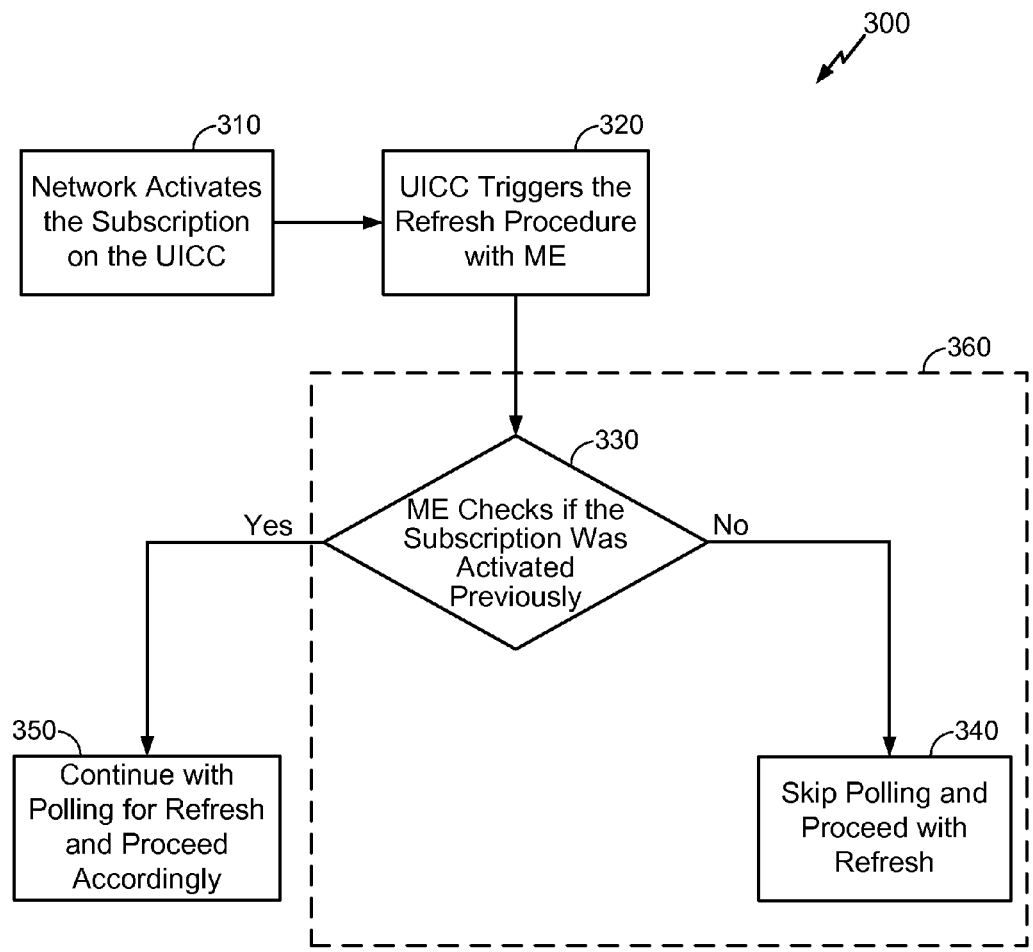
FIG. 3 illustrates an exemplary process for determining whether to skip polling and proceed with the refresh.

FIG. 3 illustrates an exemplary wireless communication network that may implement the refresh method as part of the activation procedure according to one or more of the embodiments described above. In one embodiment the refresh method is used to make ME 104 aware of the CSIM network application activation status. For example, wireless communication network 300 may be able to activate the CSIM network application subscription on UICC smart card 106 (block 310). Upon a request for activation, UICC smart card 106 triggers a refresh procedure with ME 104 (block 320). When the refresh procedure is triggered with ME 104, ME 104 checks to see whether the CSIM network application data and definitions were previously activated (block 330).

ME 104 can determine the activation status by checking if the CSIM network application on UICC smart card 106 is activated. ME 104 can also determine activation status by checking internal records to see if such activation has already been recorded and whether or not activation and/or new updates are necessary. ME 104 may be checking the activation on any of a number of operations, steps, items or interactions that are occurring within the CSIM network application, including checking the IMSI_M activation status. Depending on the activation status, ME 104 could follow the method of polling for refresh or skip the polling and proceed immediately with a refresh. Thus, when ME 104 checks if the CSIM network application subscription on UICC smart card 106 has been previously activated (block 330), ME 104 may continue with polling for refresh and proceed accordingly (block 350) or ME 104 may skip the polling altogether and proceed with the refresh immediately (block 340). Box 360 indicates a decision making process that may be utilized by ME 104 in which polling may be skipped in order to expedite the refresh procedure even though the refresh may result in discontinuation of an active call. Alternatively, the above referenced decision making process can also be utilized by UICC smart card 106 in which polling may be skipped in order to expedite the refresh procedure.

Figure 4:
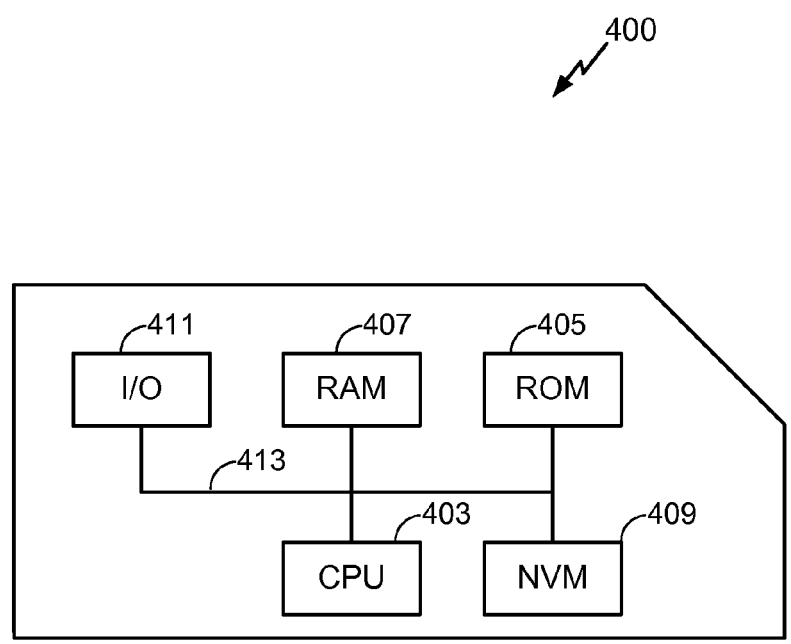
FIG. 4 is a schematic illustration of an exemplary architecture of the hardware of a UICC that may be used in conjunction with the disclosure.

FIG. 4 is a schematic illustration of an exemplary internal architecture of the hardware of a UICC smart card 400 that may be used. UICC smart card 400 is equivalent to UICC smart card 106 illustrated in FIG. 1. UICC smart card 400 includes a central processing unit 403, a read-only memory (ROM) 405, a random access memory (RAM) 407, a non-volatile memory (NVM) 409, and a communications interface (I/O) 411 for receiving input and placing output to ME 104. These various components are connected to one another by bus interface 413. In one embodiment of the disclosure, communication network applications, as well as other software modules, may be stored on UICC smart card 400 in ROM 405. Such applications include but are not limited to SIM, USIM and CSIM. In alternative embodiments, the software modules stored in ROM 405 may also be stored in a flash memory such as non-volatile memory 409.

For purposes of illustration, an embodiment is described using ROM 405 as an example. However, those skilled in the art will appreciate that this should not be construed as limiting the scope of the various embodiments disclosed and claimed. Wherever ROM 405 is used, for example, flash memory and other types of non-volatile memory can be substituted as an alternative. ROM 405 may also store some type of operating system, e.g., a Java Virtual Machine. During operations, CPU 403 operates according to instructions in the various software modules stored in ROM 405.

In another exemplary embodiment, UICC smart card 400 may contain CSIM network application functionality. A network connection may be established between UICC smart card 400 and ME 104 in which UICC smart card 400 has been inserted. With such a network connection, ME 104 can access UICC smart card 400 by using a user interface or a web browser on ME 104 for example. The connection also enables outside network connection for UICC smart card 400 through ME 104, which connects to outside network via various physical links, such as Universal Serial Bus (USB), General Packet Radio Service (GPRS), 3G, 4G, LTE, WiFi, Bluetooth, and Infrared.

In one exemplary embodiment, I/O 411 may be configured to receive network application activation status requests from ME 104 at which point I/O 411 passes along the request to CPU 403 via bus interface 413 for processing. Upon receiving the request, CPU 403 may perform a number of operations, in parallel (simultaneously) or in series (sequentially). For example, when the request is received from ME 104, CPU 403 may poll ME 104 services to determine whether to proceed with a refresh or not. CPU 403 may also access network application CSIM to retrieve the requested information before, in parallel with, or after processing the request and polling ME 104 services. The requested information may be the activation information on any of a number of operations, steps, items or things that are occurring within the CSIM network application, including checking the IMSI_M activation status. If polling is skipped, CPU 403 may be configured to receive an update command from ME 104 to update the CSIM network application information. CPU 403 may further be configured to trigger a refresh procedure with ME 104 wherein polling of ME 104 services is skipped and CPU 403 may proceed with the refresh procedure to update the network application subscription. CPU 403 may also be configured to trigger a communication to be sent to ME 104 to trigger a refresh procedure with ME 104. In this case, ME 104 may check if the CDMA subscription was previously activated and proceed accordingly by either polling or by skipping the polling and proceeding with a refresh procedure. If polling is skipped and a refresh procedure ensues, a ME 104 user may be informed that ME 104 services are temporarily not available or disabled due to the refresh procedure.

Figure 5:
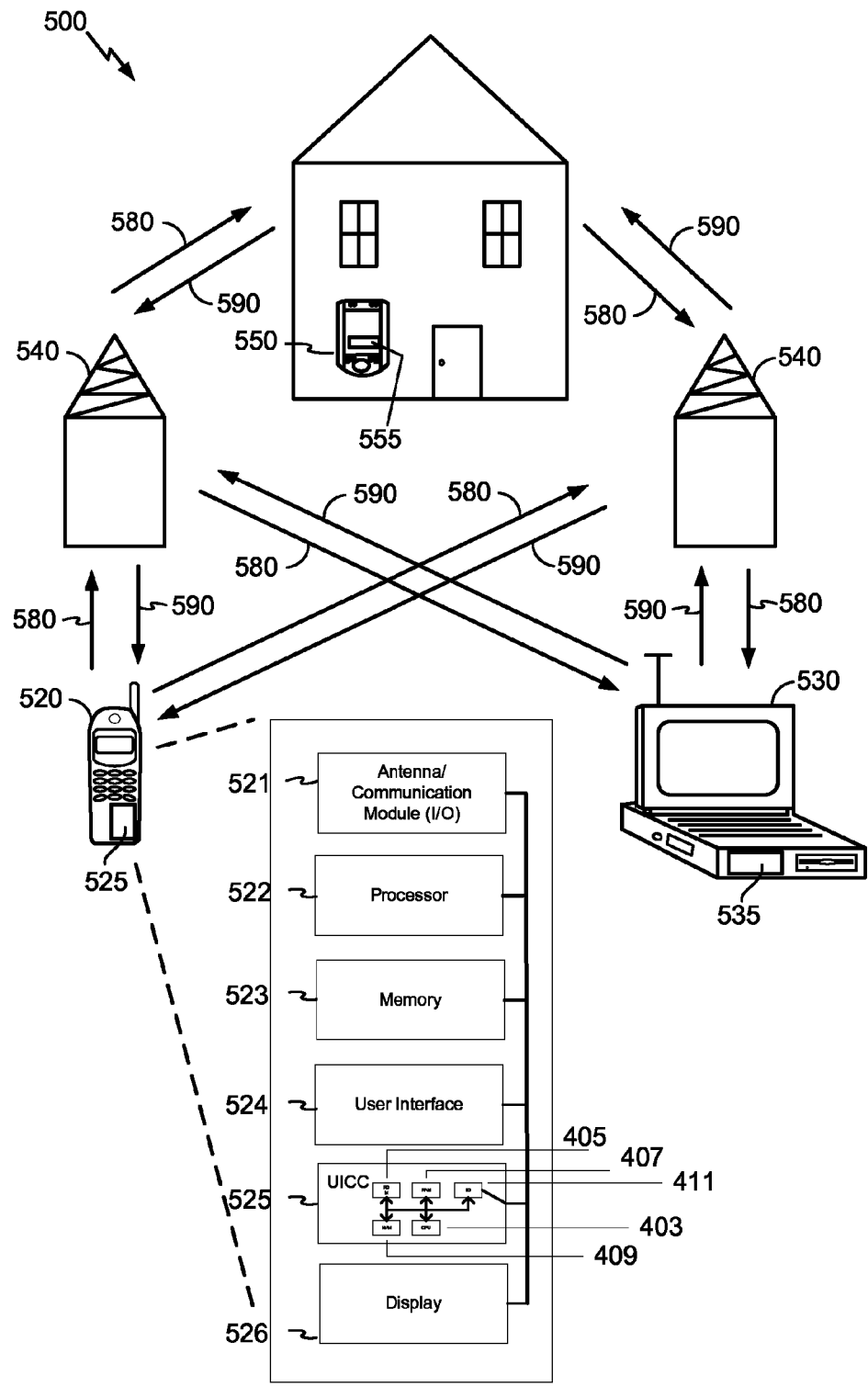
FIG. 5 shows a functional block diagram of example personal computing devices according to one or more exemplary embodiments.

FIG. 5 illustrates an exemplary wireless communication system 500 in which one or more embodiments of the disclosure may be advantageously employed. For purposes of illustration, the exemplary wireless communication system 500 shows three remote units 520, 530, and 550 and two base stations 540. The base station illustration 540 may also include cell towers, such as cell tower 102 illustrated in FIG. 1. Conventional wireless communication systems may have many more remote units and base stations. Remote units 520, 530, and 550 can include mobile devices which can include one or more of UICC smart cards 525, 535, and 555 which can include one or more communication network applications such as USIM and CSIM in accordance with various exemplary embodiments, for example, without limitation, the CSIM application described in reference to FIGS. 1 through 4, configurable to perform network application activation, such as CSIM, as described in reference to FIGS. 1 through 4. FIG. 5 shows forward link signals 580 from base stations 540 and from remote units 520, 530, and 550 and reverse link signals 590 from remote units 520, 530, and 550 to base stations 540.

Referring to FIG. 5, remote units 520, 530 and 550 may be one or more of a mobile phone, hand-held personal communication systems (PCS) unit, portable data units such as a personal data assistant, navigation devices (such as GPS enabled devices), set top box, music player, video player, entertainment unit, fixed location data unit such as a meter reading equipment, or any other device that stores or retrieves data or computer instructions, or any combination thereof, including ME 104 as discussed in FIGS. 1 *through* 4. Although FIG. 5 illustrates remote units according to the teachings of the disclosure, the disclosure is not limited to these exemplary illustrated units. Embodiments of the disclosure may be suitably employed in any device which includes at least one semiconductor die having active integrated circuitry including memory and on-chip circuitry for test and characterization.

Referring further to FIG. 5, remote unit 520 may also include several modules that are configurable to perform the activation as described in FIGS. 1 through 4. In one exemplary embodiment, remote unit 520 includes an antenna/communication module 521 that is configured to send and receive wireless communication signals to/from a cell tower (not shown) or a base station, such as base station 540. Such wireless communications may include forward link signals 580 from base stations 540 and reverse link signals 590 from base station 540 and/or from other remote devices. Upon receiving a signal via forward link signal 580 to activate a network application subscription on UICC smart card 525, such as CSIM network application, antenna/communication module 521 passes the signal to processor 522 to be processed. Processor 522 may be coupled to a memory 523, a user interface 524, UICC smart card 525 and display 526. As discussed above, UICC smart card 525 may be a platform that carries at least one application such as a CSIM network application, which requires CDMA subscription and updates.

Upon receiving a communication signal via antenna/communication module 521, processor 522 sends a request to activate the CSIM network application subscription on UICC smart card 525. Processor 522 is also configured to trigger a refresh procedure to check if the CSIM network application subscription was previously activated. If the CSIM network application subscription has not previously been activated, processor 522 then triggers a skipping procedure to skip a polling mechanism designed to poll remote unit 520 services, which may be one of several types of remote units such as a mobile equipment, communication services, and proceeds with a refresh. A refresh command is sent to UICC smart card 525 to activate the CSIM network application subscription. Processor 522 may also be configured to communicate with display 526 to allow a user to know that the dropped call was a result of an error or due to an ongoing update of the CSIM network application subscription.

Alternatively, as illustrated above and as shown in FIG. 4, the refresh and the polling can also be performed by UICC smart card's CPU 403. In one example, after receiving a refresh command from processor 522, I/O 411 may send the request to CPU 403. CPU 403 may then initiate polling mechanism of ME 104 services, check for the CSIM network application subscription on UICC smart card 525 and carry on the refresh. The subscription information may be housed in any of the memory modules, including ROM 405 and NVM 409. When it is CPU 403 that is tasked with skipping the polling and updating the CSIM network application subscription, as opposed to processor 522, CPU 403 may then relay the polling and updated status back to processor 522. After receiving the feedback, processor 522 may terminate the call and provide information to the user via display 526 or may carry on with the call if the subscription was initially activated. If polling method is determined to be the case, i.e. if processor 522 or CPU 403 decided to continue with the polling, the modules may store programming status, including initial programming status, at the time polling takes place to capture the data service votes, and network application subscription and user data. Typically, the programming status may be stored in a local memory, such as ROM 405 or memory 523.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the disclosure can include a computer readable media embodying a method for ensuring successful CSIM activation during active data call. Accordingly, the disclosure is not limited to illustrated examples, and any means for performing the functionality described herein are included in embodiments of the disclosure.

While the foregoing disclosure shows illustrative embodiments of the disclosure, it should be noted that various changes and modifications could be made herein without departing from the scope of the disclosure as defined by the appended claims. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated.

What is claimed is:

1. A method to ensure successful network application activation during an active call comprising:
    activating a network application subscription on a Universal Integrated Circuit Card (UICC) in a mobile equipment (ME);
    determining whether the network application subscription was previously activated;
    performing a refresh procedure on the ME in response to determining the network application subscription was not previously activated; and
    polling the ME in response to determining the network application subscription was previously activated to determine if the refresh procedure can proceed.

2. The method of claim 1, wherein polling the ME includes polling active services of the ME.

3. The method of claim 1, wherein polling the ME requires all votes to return a YES for the refresh procedure to proceed.

4. The method of claim 1, wherein activating the network application subscription includes activating a code division multiple access (CDMA) subscriber identity module (CSIM) information.

5. The method of claim 4, wherein the refresh procedure includes updating the CSIM information.

6. The method of claim 1, wherein performing the refresh procedure includes a triggering of the refresh procedure, and wherein the triggering of the refresh procedure is performed by an ME processor configured to store initial network application programming status.

7. The method of claim 6, wherein the triggering of the refresh procedure further comprises skipping the polling of the ME and proceeding directly to performing a refresh.

8. The method of claim 6, further comprising sending a refresh command to a UICC processor, wherein the UICC processor is configured to retrieve network application subscription information and determine whether to carry on the refresh command or not.

9. The method of claim 1, wherein the triggering of the refresh procedure is performed by a UICC processor.

10. The method of claim 9, wherein polling the ME includes polling ME services, and wherein UICC processor is configured to trigger the refresh procedure on the ME;
    skip the polling of the ME services; and
    proceed with the refresh procedure to update the network application subscription.

11. The method of claim 10, wherein the refresh procedure further includes communicating to an ME user that the ME services are temporarily disabled.

12. An apparatus for wireless communications, comprising:
    means for activating a network application subscription on a Universal Integrated Circuit Card (UICC) in a mobile equipment (ME);
    means for determining whether the network application subscription was previously activated;
    means for performing a refresh procedure on the ME in response to determining the network application subscription was not previously activated; and
    means for polling the ME in response to determining the network application subscription was previously activated, to determine if the refresh procedure can proceed.

13. The apparatus of claim 12, wherein the means for polling the ME includes means for polling active services of the ME.

14. The apparatus of claim 12, wherein the means for polling the ME requires all votes to return a YES for the refresh procedure to proceed.

15. The apparatus of claim 12, wherein the means for activating a network application subscription includes means for activating a code division multiple access (CDMA) subscriber identity module (CSIM) information.

16. The apparatus of claim 15, wherein the refresh procedure includes means for updating the CSIM information.

17. The apparatus of claim 12, wherein the apparatus further includes means for triggering the refresh procedure, wherein the refresh procedure is performed by an ME processor configured to store an initial network application programming status.

18. The apparatus of claim 17, wherein the means for triggering the refresh procedure further comprises means for skipping the polling of the ME and proceeding directly to performing a refresh.

19. The apparatus of claim 17, further comprising means for sending a refresh command to a UICC processor, wherein the UICC processor is configured to retrieve a network application subscription information and determine whether to carry on the refresh command or not.

20. The apparatus of claim 12, wherein the means for triggering the refresh procedure is configured to perform the triggering by a UICC processor.

21. The apparatus of claim 20, wherein the polling ME includes polling ME services, and wherein UICC processor is configured to:
    trigger the refresh procedure on the ME;
    skip the polling of the ME services; and
    proceed with the refresh procedure to update the network application subscription.

22. The apparatus of claim 21, wherein the means for performing the refresh procedure further includes means for communicating to an ME user, that the ME services are temporarily disabled due to the refresh procedure.

23. A computer program product for wireless communications in a wireless network, comprising:
    a non-transitory computer-readable medium having program code recorded thereon, the program code comprising:
        program code to activate a network application subscription on a Universal Integrated Circuit Card (UICC) in a mobile equipment (ME);
        program code to determine whether the network application subscription was previously activated;
        program code to perform a refresh procedure on the ME in response to determining the network application subscription was not previously activated; and
        program code to poll the ME in response to determining the network application subscription was previously activated, to determine if the refresh procedure can proceed.

24. An apparatus for wireless communication, comprising:
    a memory;

a Universal Integrated Circuit Card (UICC); and at least one processor coupled to the memory and the UICC, the at least one processor configured to:

check whether a network application subscription was previously activated; and perform a refresh procedure upon a result of the check indicating the network application subscription was not previously activated wherein the refresh procedure is performed by skipping a polling mechanism.

25. The apparatus of claim 24, wherein the at least one processor is further configured to carry on the polling mechanism upon a result of the check indicating the network application subscription was previously activated.

26. The apparatus of claim 24 wherein a network application of the network subscription corresponds to communications networks that include at least one of Global Systems for Mobile Communications (GSM), Universal Mobile Telecommunications System (UMTS), 3rd Generation Partnership Project (3GPP) and/or Long-Term Evolution (LTE) networks.

27. The apparatus of claim 24, wherein a network application of the network subscription is a Code Division Multiple Access (CDMA) subscriber identity module (CSIM).

28. The apparatus of claim 27, wherein the refresh procedure includes further configuring the at least one processor to update a CSIM activation information.

29. The apparatus of claim 28, wherein the UICC comprises:

a central processing unit (CPU);

a read-only memory (ROM); and a communications interface, wherein the communications interface is configured to receive an input and place an output of refresh procedures and CSIM subscription and activation status to an external device.

30. The apparatus of claim 29, wherein configuring the processor to update the CSIM activation information further comprises sending an update command from the processor to the UICC CPU to update the CSIM activation information.

31. The apparatus of claim 30, wherein the CPU, the ROM and the communications interface are configured to communicate via a bus interface that allows for the processing a network application activation command, a refresh procedure command, a polling command and a subscription update command.

* * * * *